United States Patent
Merritt

(10) Patent No.: US 7,292,849 B2
(45) Date of Patent: Nov. 6, 2007

(54) METHOD AND APPARATUS FOR DETERMINING GAPS IN CELLULAR PHONE AREA COVERAGE

(75) Inventor: William J. Merritt, Lititz, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 147 days.

(21) Appl. No.: 10/655,427

(22) Filed: Sep. 4, 2003

(65) Prior Publication Data
US 2005/0054339 A1    Mar. 10, 2005

(51) Int. Cl.
*H04M 11/00* (2006.01)

(52) U.S. Cl. .................. 455/421; 455/423; 455/63.2; 455/422.1

(58) Field of Classification Search ............. 455/415, 455/421, 63.2, 422.1, 423
See application file for complete search history.

(56) References Cited

U.S. PATENT DOCUMENTS 6,459,695 B1 * 10/2002 Schmitt ................. 370/344
6,597,906 B1 * 7/2003 Van Leeuwen et al. ...... 455/436
6,721,572 B1 * 4/2004 Smith et al. ............. 455/456.1
6,850,764 B1 * 2/2005 Patel ..................... 455/450
2001/0016489 A1 * 8/2001 Haymes et al. ........... 455/423
2004/0203855 A1 * 10/2004 Veerasamy et al. ...... 455/456.1

FOREIGN PATENT DOCUMENTS

EP     1 104 211     5/2001
EP     1 284 579     2/2003

* cited by examiner

*Primary Examiner*—Lester G. Kincaid
*Assistant Examiner*—Fred Casca
(74) *Attorney, Agent, or Firm*—Volpe and Koenig, P.C.

(57) ABSTRACT

Usage data is collected during active calls by user equipment (UEs) within a cellular network, the collected information being utilized together with location information to locate any gaps in cellular phone area coverage due to dropped calls. The collected data is analyzed and may be used to reallocate resources to alleviate coverage gaps and thereby increase system efficiency and operator revenue.

11 Claims, 2 Drawing Sheets

METHOD AND APPARATUS FOR DETERMINING GAPS IN CELLULAR PHONE AREA COVERAGE

FIELD OF INVENTION

The present invention relates to wireless telephone systems. More particularly, the invention relates to method and apparatus for determining gaps in service.

BACKGROUND

Presently, operators of cellular communication systems employ modeling and other methods to assess coverage gaps in wireless service. However, these methods are sometimes theoretical and/or labor intensive. In addition, the known methods are only capable of taking a snapshot on a given day. However, with the nature of radio propagation, such a snapshot can be inapplicable on a second or third day, requiring a need for determining coverage gaps.

SUMMARY

The present invention provides an inexpensive, real time and continuous method for determining coverage gaps in order to maximize coverage and hence operator revenue, as well as providing apparatus for practicing the novel technique of the invention.

BRIEF DESCRIPTION OF THE DRAWING(S)

The present invention will be understood from the consideration of the accompanying figures, wherein like elements are designated by like numerals and, wherein.

DETAILED DESCRIPTION OF THE PREFERRED EMBODIMENT(S)

At present cellular phones are being manufactured with the capability of determining the location of a user. The number of users having phones with this capability is continuously increasing. A location service may be implemented using a global positioning system (GPS) or other location techniques. System operators log cell usage, including when calls are made and the called phone number. Operators also track the time of calls.

By combining this existing information with the aforementioned location information, in accordance with the present invention, operators can now determine call coverage gaps on a real time basis through the utilization of system users instead of the operators' labor force.

More specifically, operators can now receive and store location information for each user while calls are active. This information can be stored for any period of time, with the length of time being a function of storage capacity. The operator, then, by implementation of software or other data capture programs that take existing call information can seek instances where a call made between two UEs was dropped and then reconnected within a specified short time interval. Typically such a quick reconnection indicates a dropped call since, otherwise, reconnection would typically not have taken place so rapidly. Drop call detection information is then matched against the location information for the cell phone user to determine the location where the call was dropped. Relying upon the high number of users on the system, the operator now collects dropped call data by location to determine coverage gaps.

All of the above can be implemented in software, hardware, firmware or manually, and the invention can be used to monitor system performance anytime for the purpose of allocating cellular resources to a particular area, as may be required. As an example, if an area is experiencing a high number of dropped calls in a particular period, the reason may be heavy usage in that area whereupon resources may be allocated to that area to avoid dropped calls and thereby increase operator revenue.

Figure 1:
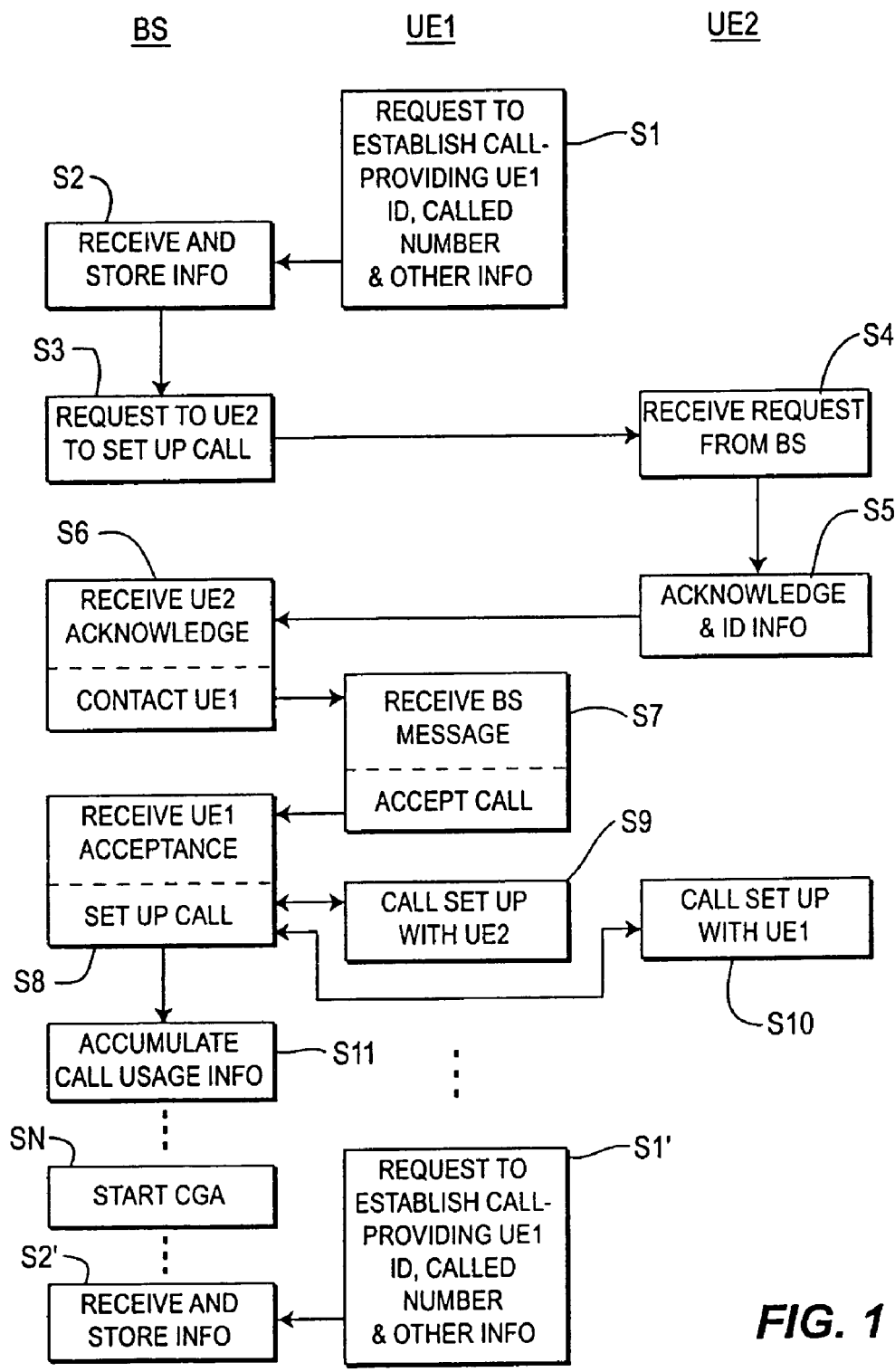
FIG. 1 shows a simplified block diagram of a cellular network comprised of a base station (BS) and two user equipments (UEs) and which is useful in describing the technique of the present invention.

FIG. 1 shows a simplified example of a wireless system in which a base station (BS) is utilized to provide call connections for a calling user equipment (UE1) and a called user equipment (UE2). The base station may also be a Node B or any station providing cell-wide or regional coverage. The user equipment (UE) may, for example, be a cellular phone having a location determining capability such as GPS or any other type of wireless communication device having similar capabilities.

The present invention encompasses situations wherein a wired phone in a public service telephone network (PSTN) calls a UE or vice versa, since the invention is directed to finding coverage holes and it does not matter whether the call is between two mobiles, or one mobile and a fixed user. The technique described herein tracks dropped calls of any type involving at least one mobile user operating as either a called or calling subscriber.

In the example given in FIG. 1, UE1, at step S1 sends a request to the BS to establish a communication with UE2, providing information which includes the ID and location of UE1 as well as the called number. The BS, at step S2, stores the ID and location information and, at step S3, sets up the call with UE2. UE2, at step S4, receives the request and, at step S5, sends an acknowledge which may further be accompanied by location information of UE2. The BS, at step S6, stores the information and completes the call, contacting UE1 by sending a control message. UE1, at step S7, receives the control message and accepts the call. At step S8, step S11 and step S10 the call is completed enabling UE1 and UE2 to communicate. The BS, at step S9, accumulates call usage information which includes the time the call was initiated, the ID of the called cell phone, UE2, and the time of the call.

At a subsequent time interval, UE1 or some other UE in the system may request another call, performing step S1', which is substantially the same as step S1, the cycle of steps set forth above being substantially repeated, the BS, for example, at step S2', performing a step substantially identical to step S2, and so forth.

At given intervals, the BS, as shown by step SN, performs a coverage gap algorithm (CGA).

Figure 2:
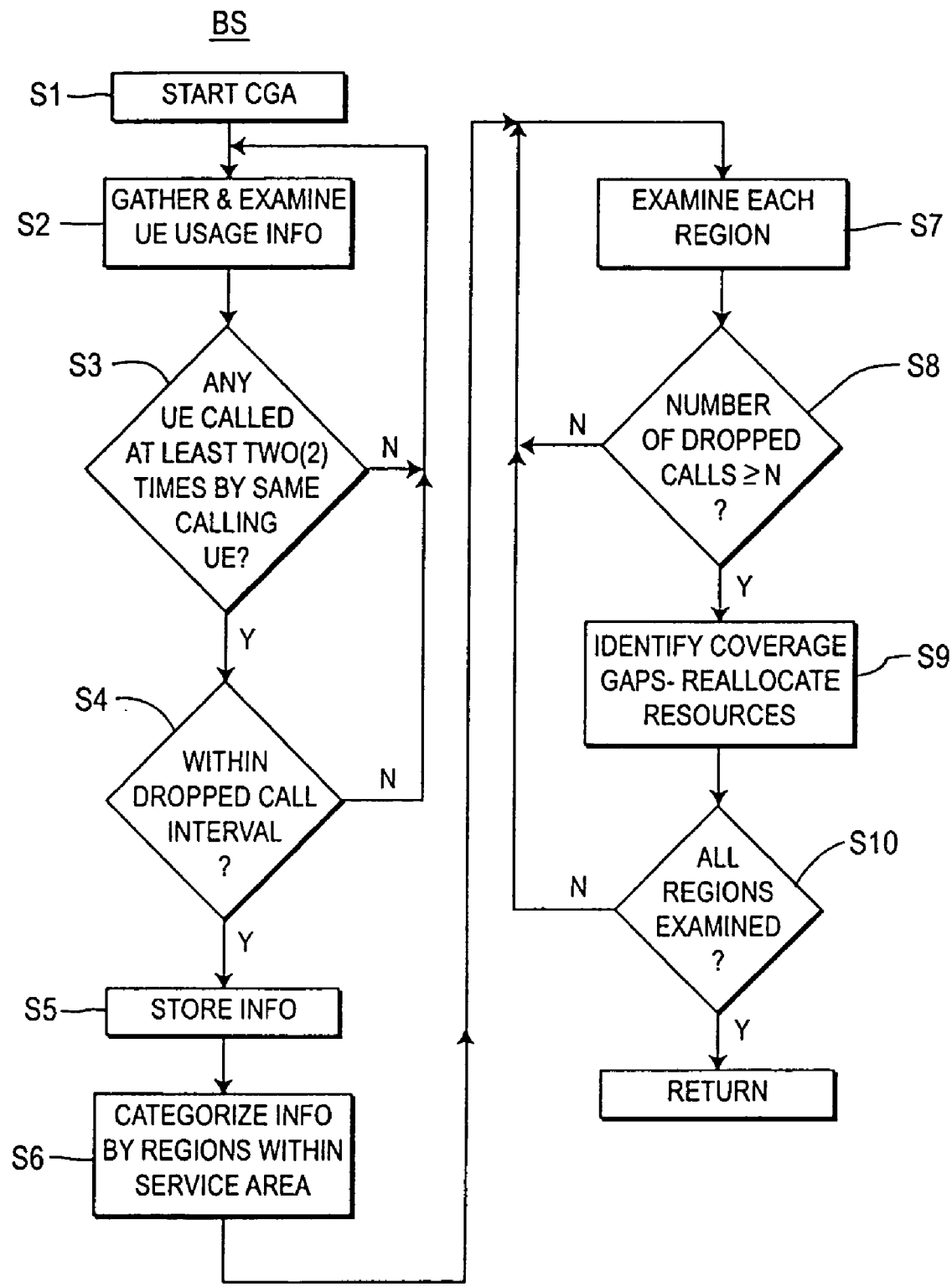
FIG. 2 is a flow diagram showing the manner in which accumulated data is analyzed and utilized.

One example of the CGA is shown in FIG. 2, wherein, upon initiation of the CGA, at step S1, the BS examines the UE usage information, at step S2. At step S3, the BS determines if any UE has been called more than once by the same calling UE or fixed user, or if a UE has initiated multiple calls to the same called UE or a fixed user, within a specified time period. This is defined as a dropped call interval. If not, the routine branches back to step S2.

If the answer in step S3 is affirmative, the routine, at step S4, determines if the interval between the two (2) calls lies within a dropped call interval which, for example, may be a value of the order of less than three (3) minutes for a single dropped call. Alternatively, if the UE has been called from the same number, or has called to the same number more than twice within the dropped call interval. The technique set forth herein assumes that a single dropped call occurring within a short interval may indicate a single coverage hole while multiple drops over a longer period of time may indicate multiple coverage gaps in an area. The period of time for the dropped call interval, or a trigger point for a single dropped call would be operator dependant and could be set based on a variety of factors including whether regions have known coverage issues (meaning that the interval for such regions would be set to avoid continued notification of coverage problems), whether the operator has a particular desire to monitor coverage in a certain area, and the like.

If these two (2) calls are not within a dropped call interval, the routine returns to step S2. If the results of the examination prove affirmative, the information is stored, at step S5. The stored information is categorized by regions within the service area, at step S6.

The number of dropped calls for each region is examined, one region at a time, at step S7 and, at step S8, if the number of dropped calls for the region exceeds a given number N, the operator takes some action such as reallocating resources, at step S9. If all of the regions have yet to be examined, the routine returns to step S7, this condition being examined at step S10. If all the regions have been examined, the routine returns to the start, i.e., step S1. The techniques shown herein are merely exemplary and should be understood that the evaluations may be performed manually or by any other equivalent methodology within the scope and spirit of the present invention.

What is claimed is:

1. A method for determining coverage gaps in a service area of wireless communications system; the method comprising:
   a first user equipment (EU) conveying to a base station (BS) a request to establish a new call;
   said BS establishing the new call;
   said BS storing usage information related to the established new call, said usage information including the time of day the call was initiated; and
   said BS determining gaps in a cellular area coverage and the time of day those gaps exist based upon said usage information;
   wherein the determining step further comprises identifying dropped calls based on the usage information; and
   categorizing dropped calls into regions within a service area of the BS;
   comparing a number of dropped calls identified in said region against a given dropped call threshold;
   identifying a coverage gap when the number of dropped calls is greater than said given dropped call threshold; and
   reallocating system resources responsive to identification of a real time coverage gap.

2. The method of claim 1, wherein said usage information further includes an identification (ID) of the first UE and a length of time of the new call.

3. The method of claim 1, wherein said determining step determines whether said first UE has at least one previously established call with a second UE and, if so, said BS, measures an interval between said at least one previously established call and said new call to determine whether said at least one previously established call was dropped.

4. The method of claim 3, wherein the determining step further comprises:
   comparing the measured interval between said at least one previously established call and said new call with a given threshold; and
   confirming a dropped call when said interval is less than said given threshold.

5. The method of claim 1, wherein said usage information further includes a location of said first UE.

6. The method of claim 1 wherein said request to establish a call includes at least an identification of a second UE; and at least one of said first or said second UEs is from a public service telephone network (PSTN).

7. The method of claim 1 wherein said request to establish a call includes at least an ID of a second UE; and one of said first or said second UEs is a wired telephone.

8. A system for determining coverage gaps in wireless communication network; the system comprising:
   a first user equipment (UE); and
   a base station (BS), wherein the first UB conveys to the BS a request to establish a new call; and said BS stores usage information related the established new call, and determines gaps in the cellular area coverage based upon said usage information said usage information including the time of day the call was initiated,
   wherein the determining step further comprises identifying dropped calls based on the usage information; and
   the BS categorizes dropped calls into regions within a service area of the BS; wherein
   the BS determines a coverage gap of a given region by comparing a number of dropped calls for said given region against a given dropped call threshold, and identifies a coverage gap when the number of dropped calls is greater than said given dropped call threshold; and
   wherein the BS reallocates system resources responsive to identifying a coverage gap.

9. The system of claim 8, wherein said usage information further includes an identification (ID) of the first UE and a length of time of the new call.

10. The system of claim 8, wherein the base station further comprises:
    a processor for evaluating said usage information to determine whether a previous call by the first UE was dropped, wherein a dropped call is determined where said first UE has at least one previously established call with a second UE and an interval between said at least one previously established call and said new call is less than a given threshold.

11. The system of claim 8, wherein the BS gathers information relating to a location of the first UE.

* * * * *

UNITED STATES PATENT AND TRADEMARK OFFICE
CERTIFICATE OF CORRECTION

PATENT NO. : 7,292,849 B2
APPLICATION NO. : 10/655427
DATED : November 6, 2007
INVENTOR(S) : William J. Merritt Page 1 of 1

It is certified that error appears in the above-identified patent and that said Letters Patent is hereby corrected as shown below:

At claim 1, column 3, line 37, after the word "equipment", delete "(EU)" and insert therefor --(UE)--.

At claim 8, column 4, line 26, after the word "first", delete "UB" and insert therefor --UE--.

At claim 8, column 4, line 28, after the word "related", insert --to--.

At claim 8, column 4, line 30, after the first use of the word "information", delete "said usage information".

Signed and Sealed this

Twentieth Day of May, 2008

JON W. DUDAS
*Director of the United States Patent and Trademark Office*